J. LEDWINKA.
ADJUSTABLE SEAT STRUCTURE.
APPLICATION FILED MAR. 21, 1916.
1,251,977.
Patented Jan. 1, 1918.
2 SHEETS—SHEET 1.
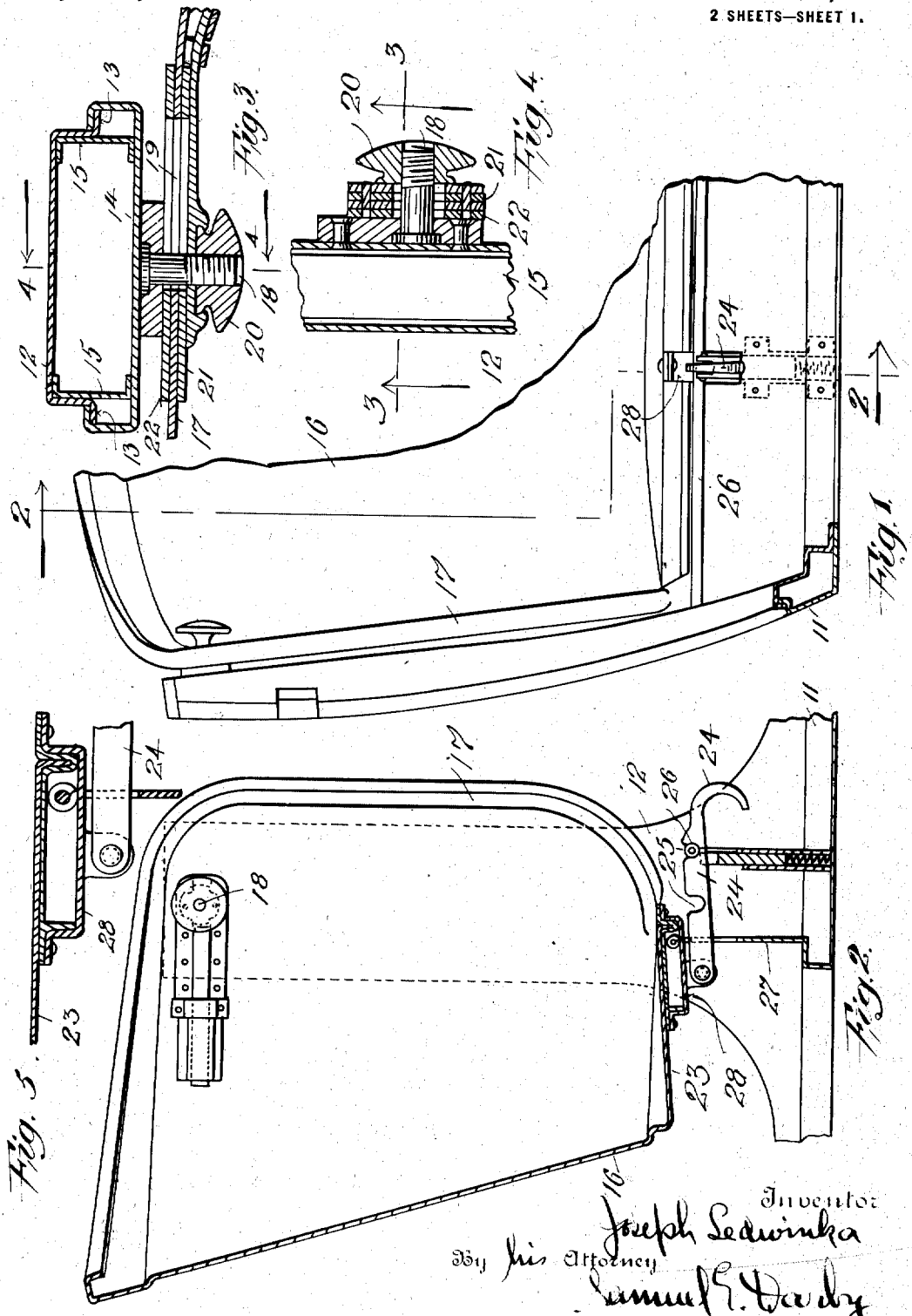
Inventor
Joseph Ledwinka
By his Attorney
Samuel E. Darby

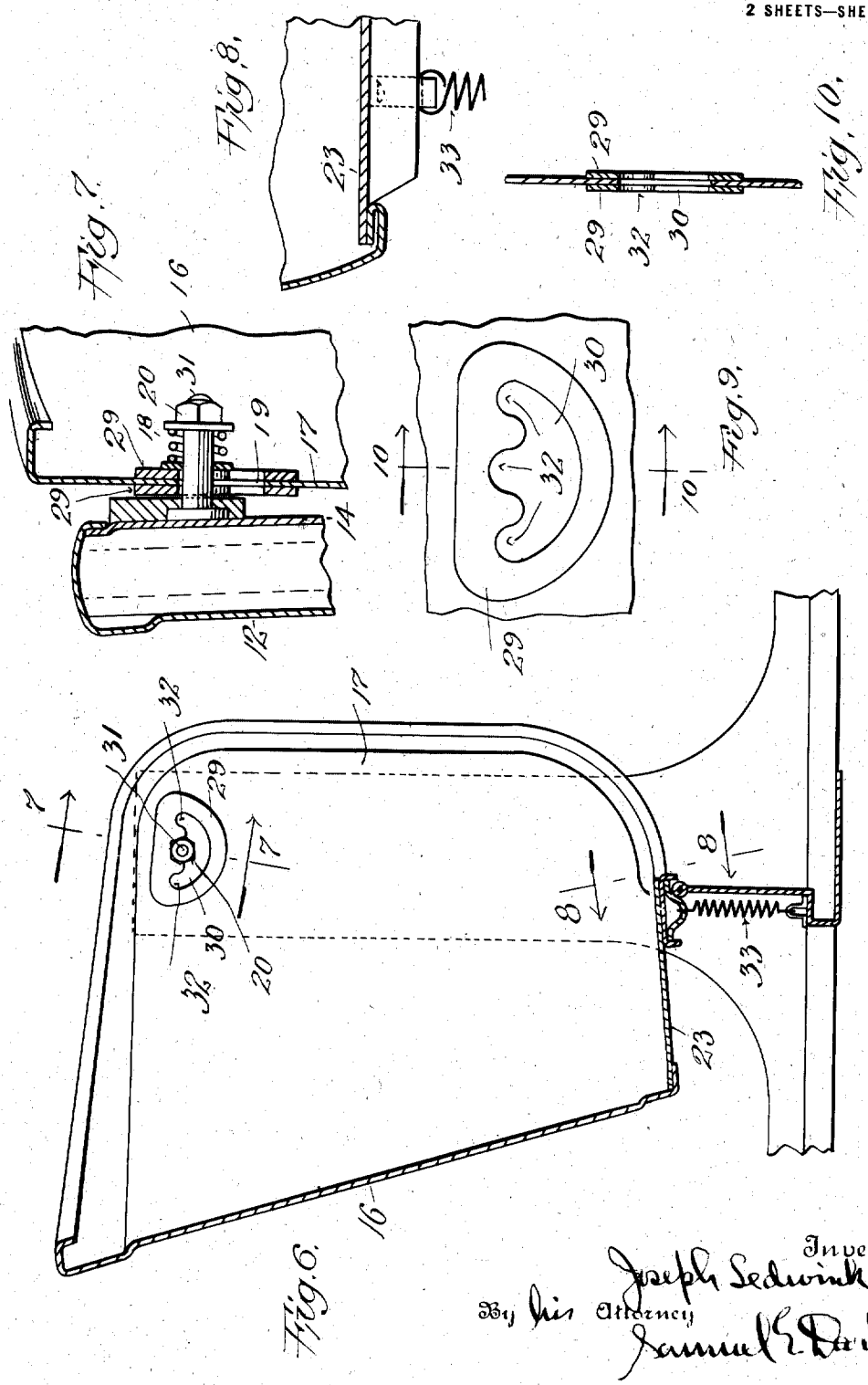

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ADJUSTABLE-SEAT STRUCTURE.

1,251,977.     Specification of Letters Patent.     Patented Jan. 1, 1918.

Original application filed October 20, 1915, Serial No. 56,967. Divided and this application filed March 21, 1916. Serial No. 85,598.

*To all whom it may concern:*

Be it known that I, JOSEPH LEDWINKA, a citizen of the United States, residing at Philadelphia, in the county of Philadelphia, State of Pennsylvania, have made a certain new and useful Invention in Adjustable-Seat Structures, of which the following is a specification.

This invention relates to adjustable seat structures.

The object of the invention is to provide a seat structure which is simple and efficient and wherein the vehicle seat may be adjusted either forwardly or backwardly and may be tilted in order to comfortably accommodate different individuals, particularly in the case of the front or driver's seat for automobiles.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

Referring to the accompanying drawings:

Figure 1 is a broken view in front elevation showing a seat structure embodying my invention, parts of the vehicle body being shown in vertical transverse section.

Fig. 2 is a view in vertical section on the line 2, 2, Fig. 1, looking in the direction of the arrows.

Fig. 3 is a broken detail view in horizontal section on the line 3, 3, Fig. 4.

Fig. 4 is a similar view in vertical section on the line 4, 4, Fig. 3.

Fig. 5 is a broken detail view in vertical section on the line 2, 2, Fig. 1, showing the manner of shiftably supporting the seat frame.

Fig. 6 is a view similar to Fig. 2 showing a modified construction of adjustable seat embodying the principles of my invention.

Fig. 7 is a broken detail view on the line 7, 7, Fig. 6.

Fig. 8 is a similar view on the line 8, 8, Fig. 6.

Fig. 9 is a broken detail view in front plan of a bracket employed in connection with the adjustment of the seat structure shown in Fig. 6.

Fig. 10 is a transverse section of the same on the line 10, 10, Fig. 9.

The same part is designated by the same reference numeral wherever it occurs throughout the several views.

In my pending application Serial No. 56,967, filed Oct. 20, 1915, from which the subject matter of the present application is divided, I have shown, described and claimed a structure of automobile body made up of sheet metal stampings, pressed to the desired shape and contour and integrally connected together to form a complete body including vertical portions constituting door posts.

In use of bodies so constructed, as well as in other types and structures of bodies, and particularly in the case of automobile bodies, it is desirable to adjust the front or driver's seat either forwardly or backwardly and also to adjustably tilt the same in order to accommodate different drivers or chauffeurs or other occupants or users of the seat. It is among the special purposes of my present invention to provide a structure in which these desirable results are attained and in carrying out my invention I propose to apply the same in connection with a seat frame comprising a sheet metal panel or stamping pressed to the desired shape and contour with integral side and back portions, and which in the usual or any well known manner may have cushions, upholstery or trim applied thereto. I have not deemed it necessary in illustrating my invention to show the cushions or upholstery.

In the accompanying drawings 11 designates a portion of the vehicle body shell which is in the form of a sheet metal stamping pressed to the desired shape and contour corresponding to the body lines of the vehicle and having an integral vertically extending portion 12 constituting a portion of the vehicle door post. In the particular form shown the vertical portion 12 is pressed into channel shape with edge flanges 13. A vertically extending sheet metal portion 14 of channel shape is associated with the vertical portion 12 to complete the door post, said vertical portion 14 is preferably a sheet steel stamping and is also of channel shape engaging over the flanges 13 of the body member 12. If desired vertical strengthening and spacing channel shape metal stampings 15 are interposed between the members 12 and 14. By this construction an efficient strong, sturdy door post is secured which affords also supports for the seat frame in accordance with my invention. The seat frame is in the form of a sheet metal stamping pressed to the desired shape and contour and having a back portion 16 and side portions 17. The upholstery, cushions or trim, (not shown) are to be applied to this seat frame in any suitable or convenient manner. In order to movably and adjustably support the seat frame, in the arrangements shown in Figs. 1, 2, 3, 4, and 5, I secure a suitable stud 18 to the upper end of each of the inner members 14 of the post structure. Each stud extends through an elongated slot 19 formed through the side portions 17 of the seat frame and a clamp nut 20 on the inner threaded end of each stud serves to clamp the parts together in adjusted position. Inner and outer slotted reinforcing strips 21 and 22, are placed on opposite sides of the seat frame side portions 17, the stud 18 passing through slots in said strips. By this construction the seat shell may be shifted forwardly or backwardly upon the studs 18 to the extent permitted by the slots 19, and clamped in adjusted position by the clamp nut 20. If desired the seat frame, in any desired position thereof with reference to the studs 18, may be rocked or tilted about the axes of said studs. To accomplish this in one arrangement embodying my invention I pivotally attach to the floor portion 23 of the seat frame a latch 24 having notches 25 therein, any one of which may be yieldingly pressed in any convenient manner into engagement with a transversely extending rod 26, secured fixedly in any convenient manner to the inner post member 14 adjacent its lower end. By detaching the latch 24 from rod 26 and tilting the seat frame about the axes of studs 18 some one or another of the notches 25 may be engaged with the rod 26 to secure the desired tilting adjustment of the seat frame. If desired and in order to assist in supporting the seat frame a transversely extending tie or brace member 27, which in the form shown is formed from a sheet metal stamping may be secured in any convenient or suitable manner to the lower portions of the inner members 14 of the post structure. The upper edge of this supporting brace member constitutes a rest to aid in supporting the seat frame. In order to permit the forward and backward as well as the tilting adjustment of the seat frame and at the same time to retain engaging relation between the tie brace 27 and the seat frame, the upper edge of said brace member works in a keeper 28 applied to the under surface of the floor portion, the keeper having a sufficient span to permit the desired range of adjustment of the seat frame.

In Figs. 6, 7, 8, 9, and 10, I have shown a modified arrangement for securing the desired forward, backward, and tilting adjustments of the seat frame. In this arrangement the adjustments above described are secured by employing suitable plates 29 having arc-shaped slots 30 therein, applied to the inner and outer surfaces of the side portions 17 of the seat frame. Stud bolts 31 secured to the post structure in any convenient manner extend through the slots 30 and also through corresponding slots in the side portion 17 of the seat frame. Slots 30 have seats 32 formed therein into any one of which the stud bolts 31 may be seated when the seat shell attains the desired adjustment. In this form of my invention the seat frame is movably held upon the supporting brace member 27 by means of a tension spring 33.

From the foregoing description it will be seen that I provide an exceedingly simple, strong, durable and efficient structure for securing a desirable range of adjustment of the seat frame forwardly or backwardly as well as tiltably to accommodate any desired conditions of use, and while I have shown and described specifically a structure for accomplishing the desired purposes my invention, as defined in the claims, is not to be confined to the details thereof.

Having now set forth the objects and nature of my invention and constructions embodying the principles thereof, what I claim as new and useful and of my own invention and desire to secure by Letters Patent is—

1. An automobile body shell including vertically extending post portions, studs carried by the upper ends of said post portions, and a seat frame having slotted side portions, said studs extending through the slots in said side portions.

2. The combination with a vehicle body having vertical posts at the sides thereof, of a seat back frame having side portions and studs carried by the upper ends of said vertical posts, said side portions being supported upon said studs for tilting movement thereon and also for shifting movement relatively thereto.

3. A vehicle body having vertically extending post portions at the sides thereof and a seat frame adjustably connected at its sides to the upper ends of said post portions for tilting and forward and backward adjustment thereon.

4. A vehicle body having vertically extending side posts and a seat frame tiltably connected at the upper forward portions of its sides to the upper ends of said posts.

5. The combination with a vehicle body having vertically extending side posts and studs carried thereby at the upper ends thereof, of a seat frame having integral side and back portions, the upper forward parts of said side portions engaging said studs for forward and backward and tilting adjustment thereon and means for securing the seat frame in adjusted position.

6. The combination with a vehicle body having vertically extending post portions, and studs carried thereby at the upper ends thereof, of a seat frame having integral back and horizontally slotted side portions, said studs extending through the slots in said side portions and forming pivot supports for said frame to permit the latter to be tilted thereon and to be bodily adjusted backwardly and forwardly with reference thereto, and clamping means carried by said studs for clamping the parts together in adjusted position.

7. The combination with a vehicle body having vertically extending side posts, and studs carried thereby, at the upper ends thereof, of a seat frame having integral back and side portions, said side portions engaging said studs at the forward upper parts thereof and means to adjustably tilt and bodily shift said seat frame forwardly and backwardly upon said studs.

8. A vehicle frame having vertically extending post members, a transversely extending brace connecting the lower portions of said posts, and a seat frame resting upon said transverse member for forward and backward shifting movement thereon and movably connected to the upper portions of said posts.

9. A vehicle body having vertically extending side posts and a transverse brace connecting the lower portions of said posts, a seat frame movably supported on said brace for forward and backward movement thereon and adjustably connected to the upper ends of said posts for tilting and bodily movement forwardly and backwardly thereon.

10. A vehicle body having vertically extending side posts and a transverse brace connecting the lower portions of said posts, a seat frame movably supported by said brace for forward and backward movement thereon and connected to the upper ends of said posts for tilting and bodily movement forwardly and backwardly thereon, and means to retain said seat frame in engagement with said brace during the tilting and shifting movements of the former.

In testimony whereof I have hereunto set my hand, in the presence of the subscribing witnesses, on this 14th day of March, A. D. 1916.

JOSEPH LEDWINKA.

Witnesses:
A. H. BUXBAUM,
L. R. HILYARD.